June 8, 1948.   W. L. COUTCHURE ET AL   2,443,096
ROTARY TILLER TOOTH AND MOUNTING
Filed Sept. 26, 1944   2 Sheets-Sheet 1
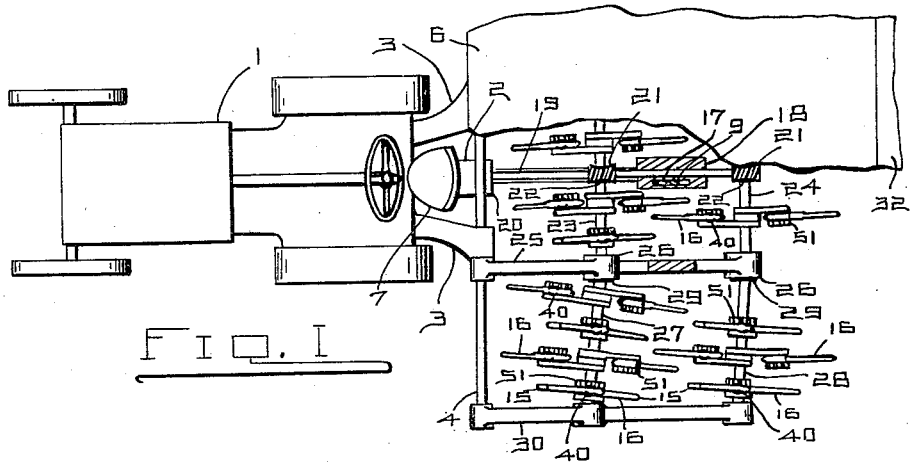
Fig. 1
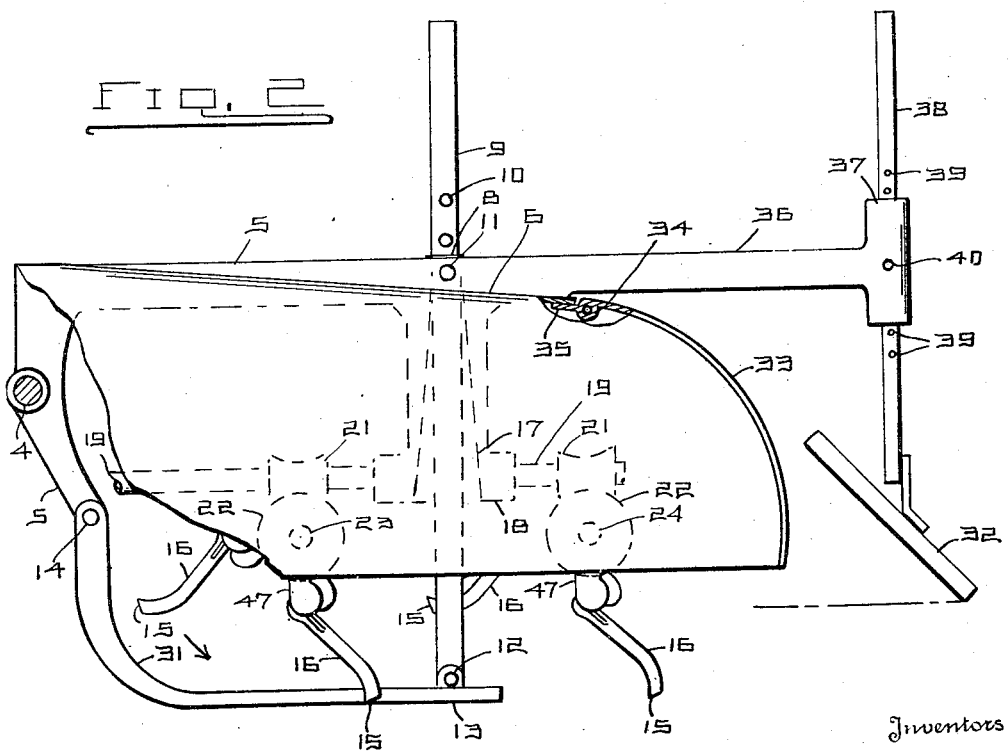
Fig. 2
Inventors
WENCEL L. COUTCHURE AND JACKSON H. ROLLINS
By 
Attorney

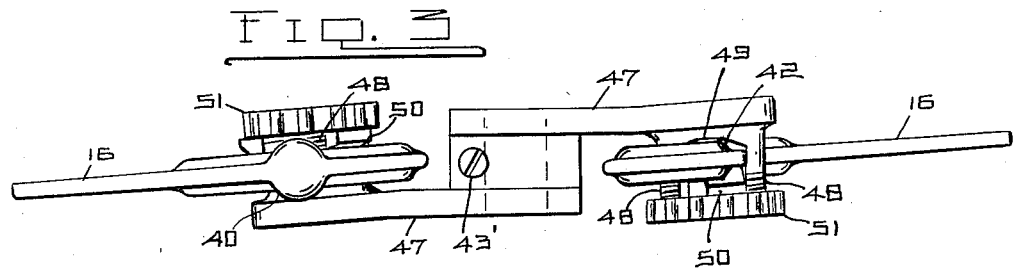
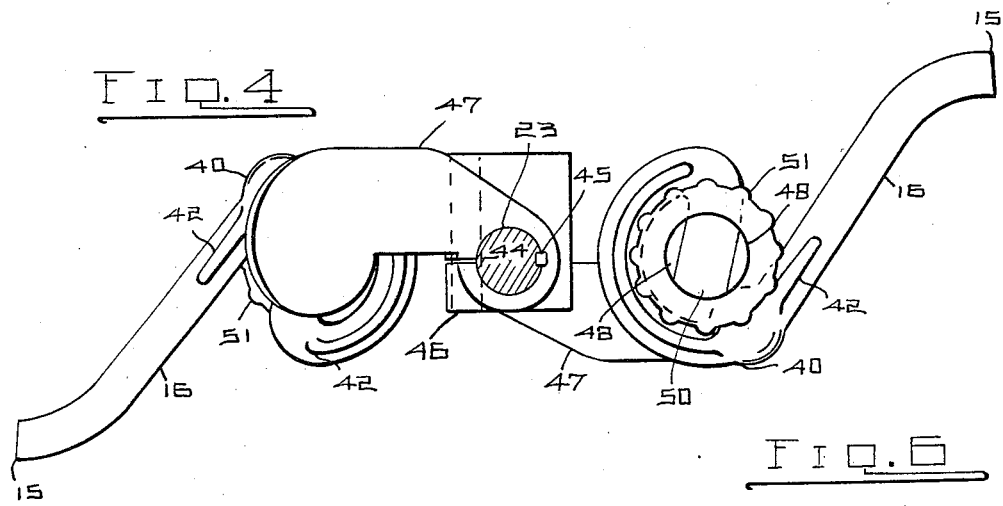
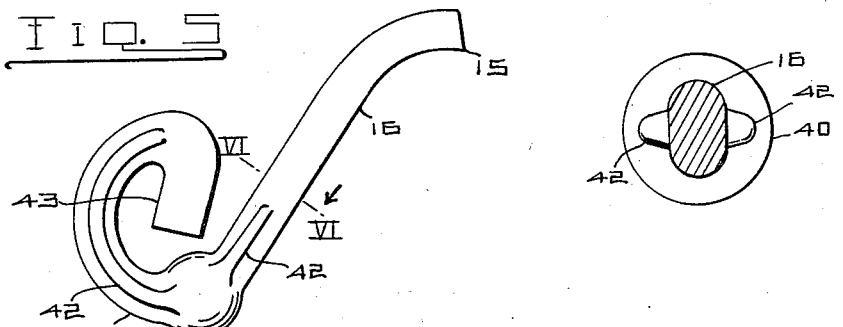
Wencel L. Coutchure and Jackson H. Rollins
Inventors

UNITED STATES PATENT OFFICE 2,443,096

ROTARY TILLER TOOTH AND MOUNTING

Wencel L. Coutchure and Jackson H. Rollins, Toledo, Ohio, assignors to Eldon H. Young, trustee, Toledo, Ohio Application September 26, 1944, Serial No. 555,815

3 Claims. (Cl. 97—216)

This invention relates to soil working, not only before seeding or setting of plants, but in their care during growth.

This invention has utility in adapting crop, soil and weather conditions for special crop production values. The approach is thru comminution of the soil and its humus to an appropriate fineness and depth consistent with the purpose sought for seeding or planting. Thereafter during the growth interval, the land care factor is directed toward crop growth advancement, as against weed growth, and toward retaining desirable moisture and mulching values to advance the harvest-time return.

Referring to the drawings:

Fig. 1 is a plan view, with parts broken away, of an embodiment of the soil comminuter as a trailer for a tractor;

Fig. 2 is a fragmentary side view of the trailer of Fig. 1, showing further features of mounting and control therefor;

Fig. 3 is a detail view in plan of a tine pair mounting having the high speed rotation for effective soil comminution;

Fig. 4 is a side elevation of the tine pair mounting unit of Fig. 3;

Fig. 5 is a detail view, in side elevation of a tine from the active comminuting tool element assembled on the mounting in Fig. 4; and Fig. 6 is a section thru a tine on the line VI—VI, Fig. 5, looking toward the vibration absorbing enlargement intermediate portion thereof.

A tractor 1 provided with a rear power take-off 2, has rearwardly extending brackets or hitch means 3 to a transverse lead shaft or bar 4. From such bar 4 as a main support, bracket or frame means 5 (Fig. 2) mounts cover or shield 6. Accordingly the driver of the tractor as in seat 7 may not have dirt or soil thrown toward him, and the high speed cutting elements are housed against injury to such operator from accident in any jolting action of the equipment.

Thru a guide 8 in the frame 5, a control bar 9 upwardly protrudes. This bar 9 has at intervals therealong openings 10 to be entered by a holding pin or bolt 11 in the frame 5. By setting this adjustment at different points, the extent of the bar 9 below the shield 6 may be varied as to its pivot connection 12 to an after portion of a guide or shoe 13 as forwardly and upwardly extending to pivotal connection 14 with the frame 5.

In non-use or transit position, the bar 9 may be set to have the shoe 13 in position below the free ends 15 of the tines 16. These accordingly will ride clear of roadway or other course away from the field where comminuting operation is to occur. The control is achieved thru a slide connection 17 beneath the rigid or frame held housing 6 and bearing 18 for propeller shaft 19 having a universal joint connection 20 with the power take-off 2. This will permit the shaft 19 to be rotated while trailing at different angles from the tractor 1. It is the purpose of the bar 4 to hold the shiftings of the shaft 19 to up and down. The shaft 19 has thereon transmission toothed means, herein shown as worms 21 in mesh with worm wheels 22 on transversely extending shaft sections 23, 24. From the bar 4 frame members 25 provide bearings 26 for the sections laterally from the bearing 18. At these bearings 26, are universal joints or couplings for additional shaft sections 27, 28, to the width extent as may be desired. As of advantage for keeping the tractor in straight ahead travel, the couplings 29 at the bearings 26 allow for slight advance setting of the outer end portions of the sections 27, 28, which may be fixed by frame members 32 from the bar 4.

In operation, the power take-off rotation as transmitted to the shaft sections and thereby to the tines 16, develops a spinning or rotation. When the bar 9 is set for the shoe 13 to glide at a position inward from the outer end 15 arc, the load of the operating parts holds the tine ends 15 in active position for cutting or comminuting operation. The tine ends 15 travel forward as entering the soil, from the tractor draft. However, as the rotary drive is effective, the soil thus gouged or cut is thrown upward under the shield 6. As the tractor progresses, its travel rate may have an influence upon the effective depth of the cut, while the position of glide for the shoe 13 is an additional factor tending to hinder cut depth increase, especially as the shoe rides in a range of say up to one half the length of the tine 16.

Experience has shown that as the shoe 13 is lifted or drawn toward the shaft section connection 17, the active members of the tool will bite or eat into the soil. As the shoe 13 has its bend 31 approach the shaft section 23, the slowness of tractor travel and high speed of rotation tend to develop further cutting depth. In fact with a tine having its end 15 8" from the center of the shaft section 23, cutting depths have been achieved of as much as 1' or more.

For holding the comminuted exposed surface of the acted-upon soil against being too loose, a compacting or gage board or member 32 may be set in clearance as to rear cover section 33 having a hinge mounting 34 on the main shield 6. Extension means 35 hold the section 33 free of the tines 16 while allowing such to swing upward at its after portion, in the event soil loosening or fluffing require clearance therefor.

Extension frame portion 36 provides a guide 37 for upwardly extending bar 38 having pin openings 39 for adjustment as to the guide 37, in thereby locating the drag member 32 to ride in compacting relation desired from the weight of the mass as rockably hanging from the bar 4.

Even cultivable soils have a wide range of hardness. The presence of some clays, caking by rain and quicky drying, are further factors. A tool which would answer almost stone hardness attack, and have a use life is developed and herein disclosed in the tine 16 of cast steel. It is the purpose hereunder to have the tine of ample cutting strength. To be effective during the pulling progress of the tractor, severe strains are imposed in compound relations. Soil hardness as opposing the drag and entering courses develop vibrations tending to weaken or crystallize metal working elements. Herein there is purpose to have sufficient yield or give in the cutting tine ends 15 to at least partially absorb the jolt or jar actions. By taking up these concussion-like actions in the tines 16, there is a material contribution to the life of the transmitting parts thereto, and their mountings.

The tine 16 has configuration to achieve these ends due to bulge or enlarged spherical cross section region 40 at entrance to a bend 41. To and from the bulge 40, ribs 42 along the body of the tine have a tendency to start to dissipate the vibrations and thereby provide control against localizing at the bulge of any strains which might develop weakness for the tine unit there. Abrupt bend 43 for the oval cross section tine provides a mounting end therefor.

Bolt 43' entering keyway 44 of the shaft section opposite a key 45, provides effective holding mounting for a split or clamp hub member 46. Diametrically therefrom extend arms 47, slightly offset, say 5° with a pair of parallel ears 48 having external thread portions. In the fork between the pair of ears 48 may be set tine end 43, on the inner side at a concave seat 49, with a concave face filler block 50 for the outer side. A nut 51 engaging the threaded portions of the ears 48 locks the block 50 to clamp the tine end 43.

The 5° offset between the mountings for a pair of tines 16 at the hub unit as carried by a shaft section, so locates the tines of this pair that they enter the ground or soil being cut up slightly out of line. With a follower shaft section or shaft sections, closer relation may be achieved by sufficient spacing between the adjacent unit pairs on one shaft that the pairs on the adjacent approximately parallel shaft section may enter to some extent therebetween. This develops a sort of staggered relationship. Furthermore, it allows a shorter set-up or assembly for the trailer mounting. It is of advantage to have the load action on the transmission distributed to approximate uniformity. To this end the tines are not set in unison for one tine of each pair to enter the soil simultaneously. Accordingly, adjacent tine pairs of hub units are at an angle. That is, with one pair in a vertical position at rest, the next pair may be horizontal, or spaced 90° for the angle therebetween. According to the extent of the hub pairs in the assembly, advantage may be taken of this angle distribution for 30°, 45°, 60°, or even such other or further variant as may be found advantageous for approximating uniform torque upon the transmission. With axial spacing of as much as 3", slight depth or mulching by surface loosening for 1" develops as uniform, due to the angle and speed. This cultivation program, as between rows of crops, effectively removes weeds and the shallow loose soil seems to retard transmission of baking sun heat, for the under soil better to conserve moisture for crop growth.

The tractor progress, whether for pedestrian followup of the tiller, or for more speed, as even up to 8 mi. per hr., is effective hereunder in the number of cuttings per foot of travel. At 5 to 7 tine cuttings into the soil per lineal foot progress, a sandy clay soil may have clods as coarse as 2" to 3"; while at less than double the soil entrance cuttings the identical soil is so predominately fines that 75% may pass thru a 6-mesh to the inch screen.

The range of adaptation hereunder is wide. The tilling or cutting effectiveness is such that use may be made hereof on sod. Fields may be somewhat overgrown with weeds and even brush or woody growths. The soil loosening operation as developed by this tiller or tine rotating comminuter, not only effects cutting and slicing, but such cracking or breaking up of the vegetation as to render it readily available to weathering attack in conversion to plant feeding values. There is a tendency to lay the more rigid lengths as more or less buried with the comminuted loosened soil, in the line of travel for the machine. This may prompt the one caring for the soil to have but one transverse row of rotating tines, and to traverse the field a second time at right angles to the first course. The tandem grouping, or two transverse rows of rotating tines, permits the more rapid preparation of the soil in a once-over at a relatively high speed with a fineness of resulting subdivision comparable with slower of half speed travel.

Agricultural land for replanting has wide characters of conditions to be met. The soil may be exposed and hard baked by the sun, in a dry season. It may be gummy and soggy, in a wet season. Each is taken care of by this tool. The tine strength and give is such as to withstand arduous and high speed operation. Again, the spinning speed tends so to throw soft soil as not to clog up under the shield. Stubble and even corn stalks, from husking afield, do not have to be burned or dragged off, but are so grappled with by the tines as to be buried for soil enrichment.

The transversely grouped shaft sections, not only serve in their angular relation to reduce or eliminate any unscratched intermediate regions, but develop a uniform swath or course width. For the small plot, or pedestrian directed tractor, a single short shaft section for tines to have overall extent suitable for travel between rows, may be effective for weeding, to desired plowing depth.

The tines 16, having the curvature toward the ends 15 may be set in either direction for action. As a factor in reducing the power for pulling, the downward swing of the tine ends 15 is forward of the shaft section upon which carried for rotation. Accordingly as entering the soil and moving rearwardly at a rate exceeding the travel of the tool, there is a sort of pushing action effective thereby to reduce the pull load for the tractor.

With the tine ends 15 having the convex edge thrusting downward into the soil, the resistance to rotation is somewhat less than when the concave side strikes. While this easing up as to power consumption for the individual tine may seem negligible, such is a cumulative factor in considering the number of tines and their entrance into the soil per minute.

When the sharp or concave edge enters the soil, its biting and holding action tends to be more fixed. The experience is that with the convex edge, the impact, especially in relatively hard soils, tends to increase the lateral vibration of the tine. The result is a seemingly more generous loosening width of the soil per tine entrance.

Due to the nicety of controls adaptable hereunder, the operator may gage the character and depth of soil treatment as may be toward achieving maximum advantage. With hard packed surface for the soil, depth of moisture requirements seem to be deeper. The harder soil tends to develop fissures and the drying out of the surface develops deeper and deeper. To counteract such tendencies tending to famish crop growths, the operator may set the tool herein to be active to a depth to reach the moisture. The comminuting action is effective to bring such moisture into uniform distribution thruout the cultivated depth undertaken. The drag 32 may lay the fines of the top or surface sufficiently tight to resist ready wind-blowing thereof, while such is still sufficiently uniformly carrying voids as to resist moisture up travel therethru. Weed growth is killed, subdivided and buried, for its moisture and humus contribution to plant growth values.

What is claimed and it is desired to secure by Letters Patent is:

1. A soil comminuter rotary shaft, a hub fixedly mounted thereon and having axially and angularly spaced radially extending arms, there being oppositely directed seats away from parallel to the shaft and at the free ends of the arms, and a tine in each mounting seat having an initial acute angle bend radial of the seat and toward the shaft, said tine from the bend extending about the mounting seat and therebeyond to a free end more remote from the shaft than the seat.

2. A soil comminuter rotary shaft, a hub fixedly mounted thereon and having axially and angularly spaced radially extending arms, there being oppositely directed seats away from parallel to the shaft and at the free ends of the arms, and a tine in each mounting seat having an initial acute angle bend radial of the seat and toward the shaft, said tine from the bend extending about the mounting seat and therebeyond to a free end more remote from the shaft than the seat.

3. For a soil comminuter, a cast metallic tine element having a rigid clamp mounting end, remote therefrom a soil attacking end, said tine in its extent from said clamp mounting end having an inner spring-responsive yield portion and in its extent from said soil attacking end having an outer spring-responsive yield portion, said portions toward each other merging into a connecting spherical enlargement at a region of the tine normally exposed to maximum flexure stress, whereby said enlargement reduces tendency to crystallization in the tine and dampens transmission of vibration toward the clamp mounting end of the tine.

WENCEL L. COUTCHURE.
JACKSON H. ROLLINS.

REFERENCES CITED

The following references are of record in the file of this patent:

UNITED STATES PATENTS

| Number | Name | Date |
| --- | --- | --- |
| 419,333 | Hurd et al. | Jan. 14, 1890 |
| 1,122,461 | Arundel | Dec. 29, 1914 |
| 1,294,049 | Chicousky | Feb. 11, 1919 |
| 1,419,722 | Dittmar | June 13, 1922 |
| 1,740,069 | Chase | Dec. 17, 1929 |
| 1,862,304 | Grams | June 7, 1932 |
| 1,992,313 | Langley | Feb. 26, 1935 |
| 2,012,434 | Pedersen | Aug. 27, 1935 |
| 2,140,871 | Hart | Dec. 20, 1938 |
| 2,156,567 | Lacey | May 2, 1939 |
| 2,168,733 | Dufour | Aug. 8, 1939 |
| 2,199,954 | Kelsey | May 7, 1940 |
| 2,214,702 | Seaman | Sept. 10, 1940 |
| 2,221,221 | Seaman | Nov. 12, 1940 |
| 2,366,624 | Kelsey | Jan. 2, 1945 |
| 2,366,625 | Kelsey | Jan. 2, 1945 |
| 2,388,553 | Kraus | Nov. 6, 1945 |